US010860664B2

(12) United States Patent
Manoharan et al.

(10) Patent No.: US 10,860,664 B2
(45) Date of Patent: Dec. 8, 2020

(54) DATA FLOOD CHECKING AND IMPROVED PERFORMANCE OF GAMING PROCESSES

(71) Applicant: Roblox Corporation, San Mateo, CA (US)

(72) Inventors: Aswath Manoharan, Sunnyvale, CA (US); Nikolaus Sonntag, Foster City, CA (US); Sejal Chauhan, San Jose, CA (US); David Alyea, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 332 days.

(21) Appl. No.: 15/924,905

(22) Filed: Mar. 19, 2018

(65) Prior Publication Data

US 2019/0286748 A1    Sep. 19, 2019

(51) Int. Cl.
| | | |
|---|---|---|
| *G06F 17/00* | (2019.01) | |
| *G06F 16/951* | (2019.01) | |
| *H04L 29/06* | (2006.01) | |
| *H04L 12/26* | (2006.01) | |
| *A63F 13/63* | (2014.01) | |

(52) U.S. Cl.
CPC .......... *G06F 16/951* (2019.01); *A63F 13/63* (2014.09); *H04L 43/16* (2013.01); *H04L 63/1483* (2013.01)

(58) Field of Classification Search
CPC .... G06F 16/951; G06F 16/9538; A63F 13/63; A63F 2300/535; A63F 13/35; A63F 13/75; H04L 43/16; H04L 63/148; H04L 63/1441; H04L 63/0245; H04L 63/1425; H04L 2463/144; H04L 51/046; H04L 63/1483
See application file for complete search history.

(56) References Cited

U.S. PATENT DOCUMENTS 6,199,070 B1 *   3/2001  Polo-Wood ............. G06F 16/00
7,367,888 B1 *   5/2008  Chen ....................... A63F 13/12
                                                            463/42
10,270,794 B1 *  4/2019  Mukerji ............... H04L 63/1425
(Continued)

FOREIGN PATENT DOCUMENTS

WO     2014207783    12/2014
WO     2015071909     5/2015

OTHER PUBLICATIONS

Yu et al., "SBotMiner: Large Scale Search Bot Detection". (Year: 2010).*

(Continued)

*Primary Examiner* — Syed H Hasan
(74) *Attorney, Agent, or Firm* — IP Spring

(57) ABSTRACT

A system and method identifies activity data that is related to activity of a plurality of users of a gaming platform. The activity data is used by the gaming platform to perform a gaming process. The system and method identifies first data of the activity data based on a first characteristic. The first data is a subset of the activity data. The system and method determines a number of times that the first data of the activity data meets a first condition. The system and method responsive to determining that the number of times that the first data of the activity data meets the first condition satisfies a first threshold, modifies the activity data by removing the first data from the activity data. The system and method performs the gaming process using the modified activity data.

18 Claims, 5 Drawing Sheets

(56) References Cited

U.S. PATENT DOCUMENTS

| | | | |
|---|---|---|---|
| 2004/0259633 A1* | 12/2004 | Gentles | G07F 17/32 |
| | | | 463/29 |
| 2006/0167896 A1* | 7/2006 | Kapur | G06F 16/9535 |
| 2008/0154877 A1* | 6/2008 | Joshi | G06F 16/332 |
| 2009/0253517 A1 | 10/2009 | Bererton et al. | |
| 2010/0162350 A1* | 6/2010 | Jeong | H04L 63/1416 |
| | | | 726/1 |
| 2013/0282682 A1* | 10/2013 | Batraski | G06F 16/951 |
| | | | 707/706 |
| 2014/0045596 A1 | 2/2014 | Vaughan | |
| 2015/0095892 A1* | 4/2015 | Baggott | G06F 11/3612 |
| | | | 717/127 |
| 2015/0180894 A1* | 6/2015 | Sadovsky | G06F 3/0481 |
| | | | 726/22 |
| 2015/0378417 A1 | 12/2015 | Lim | |
| 2016/0007912 A1 | 1/2016 | Hu et al. | |

OTHER PUBLICATIONS

WIPO, International Search Report for International Patent Application No. PCT/US2019/021973, dated May 30, 2019, 3 pages.
WIPO, Written Opinion for International Patent Application No. PCT/US2019/021973, dated May 30, 2019, 8 pages.

* cited by examiner

DATA FLOOD CHECKING AND IMPROVED PERFORMANCE OF GAMING PROCESSES

TECHNICAL FIELD

This disclosure relates to the field of gaming processes and, in particular, to modifying activity data related to the activity of users of a gaming platform for use in a gaming process.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual items with other users, and so forth.

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
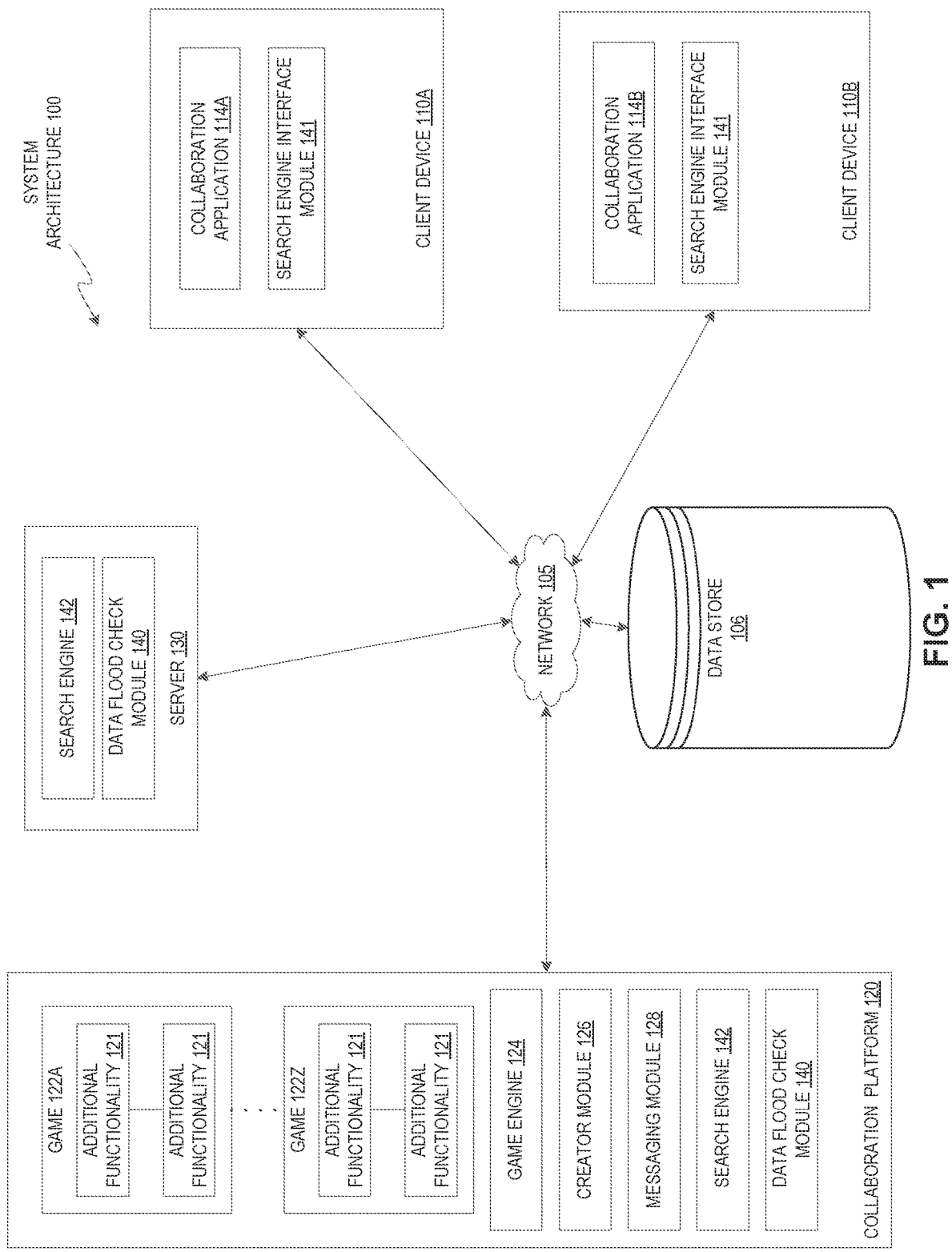
FIG. 1 illustrates an example system architecture, in accordance with implementations of the disclosure.

Collaboration platforms, such as a gaming platform, offer a variety of ways for users to interact with one another. For example, users of a gaming platform may work together towards a common goal, share various gaming items, send electronic messages to one another, and so forth. Users of a collaboration platform may play games (e.g., playing users) with characters or create games (e.g., creating users) with developmental tools via the collaboration platform. A collaboration platform may perform many processes (also referred to as "operations" herein), such as gaming processes that improve the user experience as well as the functionality of the platform. Gaming processes may include one or more search processes, a messaging process, map-reduce processes, among others.

For example, a collaboration platform may allow users to search for content items, such as games or game objects, using a search engine. A playing user may search for a game using a search term in a search query or a creating user may search for a game object using a different search term in a search query. A search process may include providing or generating relevant search results responsive to a search query for content items of the collaboration platform. To provide relevant search results, the search process may use one or more search process techniques (e.g., a machine-learning model, a heuristic model using rules, a search process algorithm, etc.) that use activity data related to the activity of users of the collaboration platform to improve the relevancy of search results. For instance, past searches and past search results may be used by the search process technique to improve future search results.

Users, such as malicious users, may flood the collaboration platform with activity data making the resultant activity data unreliable or unusable in the performance of a gaming process. "Flood" or "flooding" may refer to the sending or creating of flood data (often large amounts) on a system. "Flood data" may refer to unwanted or illegitimate data of a system. For example, flood data may be created or initiated by users of the system but does not reflect typical or realistic user usage patterns. In some instances, flood data may be created by a non-human user, such as a software program. "Flood checking" may refer to the checking for or identification of flood data on a system. Malicious users may "flood" the gaming system with flood data that affects one or more gaming processes. For instance, malicious users may use a software program (e.g., a bot) that automatically or repetitively performs searches for content items on the gaming platform (e.g., thousands of searches). The collaboration platform may save the searches performed by the bot, which records the flood data as activity data. Rather than improve the relevancy of search results, a search process using the flood data may be negatively impacted so that the search process provides irrelevant or less relevant search results.

Aspects of the present disclosure address the above-mentioned and other challenges by identifying activity data that is used by the gaming platform to perform a gaming process. The activity data may be filtered based on a first characteristic, such as a particular user account, to identify a subset of the activity data (e.g., first data). The first data may be compared to one or more conditions and a determination may be made on the number of times the first data meets the condition. The number of times the first data meets a condition may be indicative of whether the first data is flood data. Responsive to determining the number of times the first data meets the condition satisfies a threshold, the activity data may be modified by removing the first data from the activity data. The modified activity data may be provided for the performance of the associated gaming process.

Accordingly, aspects of the disclosure remove flood data from a collaboration platform and improve processes of the collaboration platform that use activity data related to activity of users. The aforementioned addresses the technological challenges in identifying and removing flood data from activity data and providing modified activity data (data where the flood data has been removed) used in the performance of a gaming process. Identifying and removing flood data and improving a gaming process by using activity data where the flood data has been removed improve the operation of a computer and computer network. For example, removing flood data increases the amount of available data storage of a system (e.g., less data to store). In another example, removing flood data from the activity data reduces the load on processing resources of a system (e.g., less data to compute for a particular gaming process) as well as reduces the load on network resources accessing and transmitting the activity data.

It may be noted that a collaboration platform described as a gaming platform herein is provided for purposes of illustration, rather than limitation. A collaboration platform may be one or more of numerous platforms, such as a social networking platform, purchasing platform, a messaging platform, user-generated content platform, and so forth. It may further be noted that aspects of the present disclosure as described with respect to gaming processes is provided for illustration, rather than limitation. Aspects of the present disclosure may be applied to process of numerous platforms.

FIG. 1 illustrates an example system architecture 100, in accordance with one implementation of the disclosure. The system architecture 100 (also referred to as "system" herein) includes client devices 110A and 110B, a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, etc.). In implementations, the server 130 may be included in the collaboration platform 120, be an independent system or be part of another system or platform. The server 130 may include data flood check module 140. In implementations, the server 130 may include search engine 142.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. In implementations, collaboration platform 120 may include data flood check module 140.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a game 122 of the collaboration platform 120.

In one implementation, collaboration platform 120 may be a gaming platform, such as an online gaming platform. For example, the gaming platform may provide single-player or multi-player games to a community of users that may access or interact with the games 122A-122Z using client devices 110. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other user of the game 122. A game 122 can include an electronic file that can be executed or loaded using software, firmware or hardware configured to present the game content (e.g., digital media item) to an entity. In some implementations, collaboration platform 120 hosts games 122 and allows users to interact with the games 122 using collaboration application 114 of client devices 110. Users of collaboration platform 120 may play, create, interact with, or build games 122, or create and build contents of games 122. For example, users may create characters, decoration for the characters, one or more virtual environments for an interactive game, or build structures used in a game 122, for example. In implementations, users may buy, sell, or trade game objects, such as in-platform currency (e.g., virtual currency), with other users of the collaboration platform 120. In implementations, collaboration platform may transmit game content to collaboration applications 114. Game content (also referred to as "content" or "content item" herein) may refer to any data or software instructions (e.g., game objects, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associate the specific user(s)

with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics, among other features.

In implementations, collaboration platform 120 may include a creator module 126. In implementations, creator module 126 may allow users to become creators to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. For example, a user may build a virtual environment that is linked to another virtual environment created by another user. A character of the virtual game may cross the virtual border to enter the adjacent virtual environment. In implementations, game objects (also referred to as "items" herein) may refer to objects that are used, created, shared or otherwise depicted in games 122 of the collaboration platform 120. For example, game objects may include a part, model, character, tools, clothing, buildings, vehicles, currency, flora, fauna, components of the aforementioned (e.g., windows of a building), and so forth.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for other users of collaboration platform 120 to view or select. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, collaboration platform 120 may include search engine 142. For purposes of illustration, rather than limitation, search engine 142 is described as allowing users to search for content items of or related to collaboration platform 120. In other implementations, aspects of the present disclosure may be used to search information generally, such as information of the World Wide Web (WWW) or other information resource, for example. In some implementations, a user may request information using a search query. A search query may refer to a request or query for information where a user supplies a search term to a search engine 142 to satisfy the request of information. A search term may refer to an input (e.g., a word, a character, a combination of words or characters, etc.) entered as part of a search query and used by the search engine 142 to provide relevant information (e.g., search results). The search engine may retrieve and return search results to the user that may include relevant information associated with the search term.

For example, in searching for a game 122 a user may enter the search term "Tycoon" into a user interface, such as search engine interface module 141 of client device 110. In another example, in searching for a game object to place in a game the creating user is developing, a creating user may enter the search the term "Car" into the developer interface. The search term may be sent via network 105 to search engine 142 of collaboration platform 120. The search engine 142 may use a search index to find information relevant to the search term. A search index may refer to information that is collected, parsed and stored to help facilitate accurate information retrieval. For instance, the search index may store the title and other metadata related to a particular game or game object (e.g., meta-keywords, description of the game or game object, user comments related to the game, etc.). In one implementation, search engine 142 may use keyword similarity techniques that compare the search term to terms associated with the games in the search index and select the most relevant games (or game object) based on keyword similarity. For example, responsive to finding one or more games that are relevant to the search term, "Tycoon" (e.g., the tile or description contains the word "tycoon" or variation thereof), links to or identifiers of one or more of the relevant games may be sent to client device 110 and displayed.

It may be noted that using keyword similarity techniques may include exact matches, matches that include the search term, matches that include spelling variations of the search term, matches with synonyms of the search term, matches with related terms, matches with related genres, and so forth. It may also be noted that keyword similarity techniques may assign similarity scores (e.g., probability) to search results that indicate a probability that a search result is similar to search term.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web browser that can access, retrieve, present, and/or navigate content (e.g., virtual character in a virtual environment, etc.) served by a web server. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130.

In implementations, a user may login to collaboration platform 120 via collaboration application 114. The user may access a user account by providing user account information (e.g., user name and password) where the user account is associated with one or more characters available to participate in one or more games 122 of collaboration platform 120.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, rather than limitation, search engine 142 and data flood check module 140 are described as implemented on collaboration platform 120. In other implementations, search engine 142 or data flood check module 140 may in part or wholly be implemented on client device 110. In other implementations, search engine 142 or data flood check module 140 may in part or wholly be implemented on server 130. In other implementations, search engine 142 or data flood check module 140 operating on one or more of client device 110, server 130, or collaboration platform 120 may work in conjunction to perform the operations described herein. In implementations, search engine interface module 141 of client devices 110 may be a separate application or part of collaboration application 114 (e.g., add-in). Although implementations of the disclosure are discussed in terms of collaboration platforms, implementations may also be generally applied to any type of social network providing connections between users.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
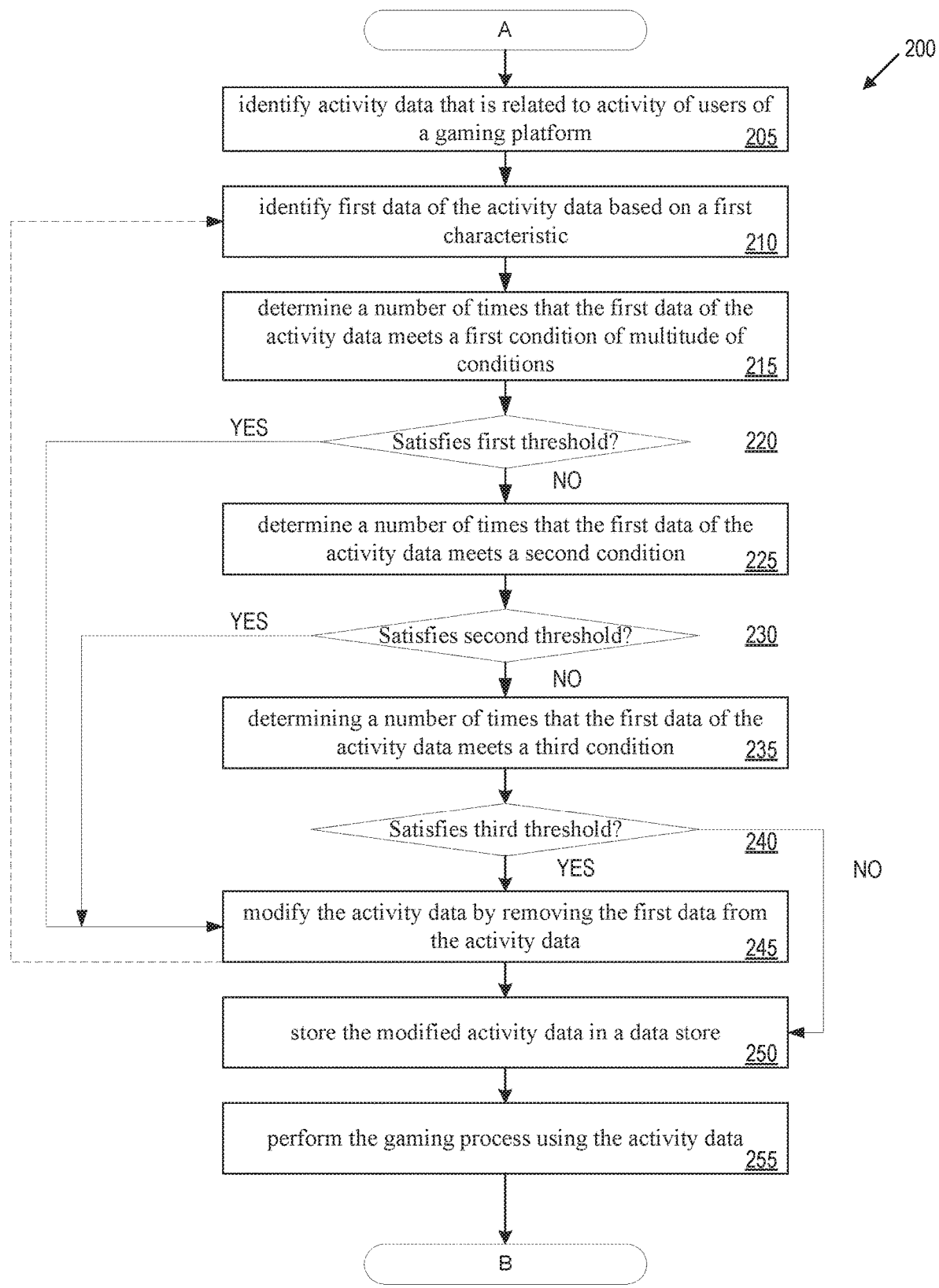
FIG. 2 is a flow diagram illustrating method for determining modified activity data used in a performance of a gaming process, in accordance with some implementations of the disclosure.

FIG. 2 is a flow diagram illustrating method 200 for determining modified activity data used in a performance of a gaming process, in accordance with some implementations of the disclosure. Method 200 may be performed by processing logic that includes hardware (e.g., circuitry, dedicated logic, programmable logic, microcode), software (e.g., instructions run on a processing device to perform hardware simulation), or a combination thereof. In some implementations, data flood check module 140 executing at collaboration platform 120 or server 130 or combination thereof may perform some or all the operations. In some implementations, data flood check module 140 in conjunction with search engine 142 executing at collaboration platform 120 may perform some or all the operations. Components of FIG. 1 may be used to help illustrate method 200. It may be appreciated that the in some implementations, method 200 may include the same, different, fewer, or greater operations performed in any order.

At block 205, processing logic identifies activity data that is related to activity of users of a collaboration platform 120, such as a gaming platform. The activity data may be used by the collaboration platform 120 to perform a process, such as a gaming process. In some implementations, data related to the performance of the collaboration platform 120 (also referred to a "general performance data") is filtered to identify a subset of the data (e.g., activity data) that is indicative of events that affect a gaming process.

For example, a collaboration platform 120 may receive and store a large amount of general performance data related to the operation of the gaming platform or activity of user of the gaming platform. The general performance data may be filtered to identify activity data that is used in a particular gaming process. For instance, a search process provides relevant search results to a search query for content items on the gaming platform. To provide relevant search results, the search process may use activity data related to previously performed searches on the gaming platform to improve relevancy of search results. The general performance data may be filtered to identify the previously performed searches on the gaming platform.

In some implementations, activity data is a subset of the general performance data, where the activity data includes data indicative of events that affect one or more particular gaming processes. Activity data may include user-generated activity data (e.g., user-generated actions such as user inputs, selections, search queries, search terms, user input with respect to search results, etc.) or include data that is related to user activity (e.g., the amount of time that a game object is inserted into a game via a developer interface). In some implementations, the activity data may include data unrelated to user activity (e.g., load statistics of a computer cluster, etc.).

In implementations, an event may refer to an occurrence of an action of interest, such as a user-generated action, that affects a gaming process. The activity data may include data indicative of one or more instances of different events or one or more instances of a single event. For example, an event affecting the search process may include a past search query. Another event affecting the search process may include a search query a selection of any content item from a search result. Another event affecting the search process may include a search query using a particular search term. Another event affecting the search process may be a user selection of a particular content item from a search result. Another event affecting the search process may include a user placement of a particular the content item in a developer's interface for a threshold amount of time. Conditions, as described further below, may include one or more events.

In some implementations, events that affect a particular gaming process may be known by administrators of the collaboration platform 120, and one or more events associated with a particular gaming process may be selected by the administrators. General performance data may be filtered to identify a subset of data (e.g., activity data) that identifies multiple instances of events that affect the particular gaming process.

In some implementations, general performance data of the collaboration platform 120 may be stored in one or more log files. Log files may be stored at data store 106, for example. The general performance data of the collaboration platform may be massive (e.g., 100's of terabytes of data) and may be constantly updated or changed as users interact with collaboration platform 120. In some implementations, the log files may be parsed to identify the activity data. For example, general performance data of the log file may be parsed to identify particular features, such as labels, of the data of the log file. The particular features, such as labels, may identify the particular events of interest. For instance. general performance data of the log file may be labeled as a particular type such as search, insert, user selection, user account, etc. The general performance data of the log file may be parsed to identify labels that are indicative of events that affect the gaming process. The data of the log file having the particular features that identify the events of interest may be filtered and included in the activity data.

In some implementations, general performance data may be for a particular time period, such as a particular hour, a particular day, a particular week, etc. Activity data acquired from the general performance data may also be of a particular time period.

In implementations, a gaming process may refer to a process performed by collaboration platform that uses activity data in the performance of at least part of the process. A search process may generally refer to one or more processes performed by search engine 142 or search engine interface module 141, and may include search query, search indexing, and search results, for example. In some implementations, the search process determines relevant search results responsive to a search query for content items on the collaboration platform 120.

At block 210, processing logic identifies first data of the activity data based on a first characteristic. The first data is a subset of the activity data. In implementations, the activity data may be filtered based on the characteristic. In one example, the characteristic is user account identifier. For instance, the first data may be a subset of the activity data where the first data is associated with a particular user account. The first data may be identified by a particular user account identifier that is associated with the particular user account. It may be noted that the operations of identifying first data of the activity data may be repeated for different user account identifiers associated with different user accounts.

In other implementations, the characteristic may be an internet protocol (IP) address, where the first data is all from the same IP address. In other implementations, the characteristic may be a time range, where the first data is from a particular time range (e.g., Tuesday). In some implementations, the characteristic may be a particular user device or browser collected by a user agent or tracker (e.g., browser tracker), for example.

For example, subsequent to filtering the data related to the performance of the collaboration platform 120 (e.g., general performance data) to identify activity data representing events that affect the performance of the search process, the activity data may be further filtered to identify a portion of the activity data (e.g., first data) associated with a particular user account (e.g., user account A).

At block 215, processing logic may determine a number of times that the first data of the activity data meets a first condition of a multitude of conditions. Multitude may refer to one or more of something. The number of times the first data of the activity data meets a condition may indicate whether the first data is flood data or legitimate data. In one implementation, the number of times that the first data of the activity data meets the first condition of the multitude of conditions may indicate a number of times a particular event (or combination of events) is performed, such as the number of times a user submits a search query to perform a search (e.g., a search query having a particular search term or any search query by the user independent of the search term) on the gaming platform (e.g., event A) and does not select any content items from search results (e.g., does not select a game to play or a game object to place into a developer interface) responsive to the search query (e.g., event B).

For example, if the condition is a search query submitted by a particular user (e.g., user account) on the gaming platform and no content items are selected from the search results, processing logic may count the number of times a portion of the activity data (e.g., first data) associated with a particular user account meets the condition. For instance, if a user account A submits 10,000 search queries in a particular day and does not select a content item from 9,800 of the corresponding search results (e.g., selects a content item 200 times), the number of times the first data of the activity data meets the first condition is 9,800 times.

At block 220, processing logic determines whether the number of times that the first data meets the first condition satisfies a first threshold. In some implementations, processing logic may compare the number of times that the first data meets the first condition (e.g., a number of times an event (or combination of events) has been performed) to the first threshold. In some implementations, the first threshold is satisfied if the number of times that the first data meets the first condition meets or exceeds the first threshold, The first threshold is not satisfied if the number of times that the first data meets the first condition is below the first threshold. The first threshold may be chosen by an administrator and be specific to the particular condition (e.g., first condition). If the first threshold is satisfied, processing logic proceeds to block 245 and removes the first data from the activity data. If the first threshold is not satisfied, processing logic moves to block 225.

For example, if the first threshold is 500 times, processing logic may compare the number of times the first condition was met (e.g., 9,800 times) to the first threshold (e.g., 500 times). If the number of times the first condition was met exceeds the first threshold (9,800>500), processing logic removes the first data from the activity data. If number of times the first condition was met does not exceed the first threshold, processing logic checks the first data against other conditions. It may be noted that in some implementations, to remove the first data from the activity data, processing logic first data may meet two or more conditions and satisfy the corresponding thresholds.

At block 225, responsive to determining that the number of times that the first data of the activity data meets the first condition does not satisfy the first threshold, processing logic may determine a number of times that the first data of the activity data meets a second condition of a multitude of conditions. In some implementations, the number of times that the first data of the activity data meets the second condition of the multitude of conditions includes a number of times a particular event (or combination of events) is performed, such as the number of times a user submits a search query to perform a search (e.g., a search query having a particular search term or any search query by the user independent of the search term) on the gaming platform (e.g., event A) and selects a content item (e.g., a particular content item or any of the content items) from search results (e.g., selects a game to play or a game object to place into a developer interface) (e.g., event C) responsive to the search query.

For example, if the condition is a search query submitted by a particular user (e.g., user account) on the gaming platform and a content item is selected from the search results, processing logic may count the number of times a portion of the activity data (e.g., first data) associated with a particular user account meets the condition. For instance, if a user account submits 10,000 search queries in a particular day and selects a content item from 200 of the corresponding search results, the number of times the first data of the activity data meets the second condition is 200 times.

At block 230, processing logic determines whether the number of times that the first data meets the second condition satisfies a second threshold. In some implementations, processing logic may compare the number of times that the first data meets the second condition (e.g., a number of times an event (or combination of events) has been performed) to the second threshold. In some implementations, the second threshold is satisfied if the to the number of times that the first data meets the second condition meets or exceeds the second threshold. The second threshold is not satisfied if the to the number of times that the first data meets the second condition is below the second threshold. The second threshold may be chosen by an administrator or be specific to the particular condition (e.g., second condition). If the second threshold is satisfied, processing logic proceeds to block 245 and removes the first data from the activity data. If the second threshold is not satisfied, processing logic moves to block 235.

For example, if the second threshold is 1000 times, processing logic may compare the number of times the second condition was met (e.g., 200 times) to the second threshold (e.g., 1000 times). If the number of times the second condition was met exceeds the second threshold, processing logic removes the first data from the activity data. If number of times the second condition was met does not exceed the second threshold (200 times the second condition met <1000 threshold), processing logic checks the first data against other conditions.

At block 235, responsive to determining that the number of times that the first data of the activity data meets the second condition does not satisfy the second threshold, processing logic may determine a number of times that the first data of the activity data meets a third condition of a multitude of conditions. In some implementations, the number of times that the first data of the activity data meets the third condition includes the aggregate of the number of times that the first condition is met and the number of times that the second condition is met.

For example, if the first condition is a number of times a user submits a search query to perform a search on the gaming platform and does not select any content items from search results responsive to the search query, and a second condition is a number of times a user submits a search query to perform a search on the gaming platform and selects a content item from search results responsive to the search query, processing logic may count the number of times a portion of the activity data (e.g., first data) associated with a particular user account meets the first condition and the number of times the first data meets the second condition and aggregate the two numbers. For instance, if a user account submits 10,000 search queries in a particular day and selects a content item from 200 of the corresponding search results, the number of times the first data of the activity data meets the first condition is 9,800 times and the number of times the first data meets the second condition is 200 times, and aggregate of the number of times the first data of the activity data meets the first condition or the number of time the first data of the activity data meets second condition is 10,000 times.

At block 240, processing logic determines whether the number of times that the first data meets the third condition satisfies a third threshold. In some implementations, processing logic may compare the number of times that the first data meets the third condition (e.g., a number of times an event (or combination of events) has been performed) to the third threshold. In some implementations, the third threshold is satisfied if the to the number of times that the first data meets the third condition meets or exceeds the third threshold, The third threshold is not satisfied if the to the number of times that the first data meets the third condition is below the third threshold. The third threshold may be chosen by an administrator or be specific to the particular condition (e.g., third condition). In implementations, the first threshold, second threshold, and the third threshold may be the same or different. If the third threshold is satisfied, processing logic proceeds to block 245 and removes the first data from the activity data. If the third threshold is not satisfied, processing logic keeps the first data as part of the activity data. In some implementations, if the third threshold is not satisfied, processing logic may proceed to block 250 and store the activity data (where the first data has not been removed). In other implementations, processing logic may return to block 210 to flood check additional data (additional first data) associated with other user accounts, for example.

For example, the number of times the first data of the activity data meets the first condition is 9,800 times and the number of times the first data meets the second condition is 200 times, and aggregate of the number of times the first data of the activity data meets the first condition and the number of times the first data of the activity data meets second condition is 10,000 times. The threshold number may be 12,000 times. 10,000 is less than 12,000 and does not satisfy the third threshold.

In some implementations, the number of times that the first data of the activity data meets the third condition includes the aggregate of the number of times events of interest occur in the first data. For example, there be three events. Event A is a user submits a search query to perform a search on the gaming platform. Event B is the user does not select any content items from associated search results. Event C is the user selects a content item from the associated search results. The number of times Event A occurs is 10,000, the number of times Event B occurs is 9,800, and the number of times Event C occurs is 200. The aggregate number of times the events of interest occur is 20,000 times, which exceeds the threshold of 10,000 and the first data may be removed from the activity data.

It may be noted that the condition checks (e.g., blocks 215-240) are illustrated as performed in an order for illustration, rather than limitation. In other implementations, the condition checks may be performed in any order or concurrently. It may be also noted, the condition checks are provided for purposes of illustration, rather than limitations. In other implementations, fewer, more, the same, or different conditions checks with the same or different conditions may be performed. It may be noted that conditions may be related to a particular process, and conditions for different processes may be different so that the conditions affect the particular process.

At block 245, responsive to determining that the number of times that the first data of the activity data meets the first condition (or other conditions) satisfies a first threshold (or other threshold associated with other conditions), processing logic modifies the activity data by removing the first data from the activity data. As illustrated by the dashed arrow returning to block 210, the operations may performed multiple times. For instance, the first data in a first instance may be associated with a particular user account. The operations may be performed for data for any number of additional portions of activity data that are associated with different user accounts (or by any other characteristic that is used to filter the activity data).

At block 250, processing logic may store the modified activity data at for example, data store 106. In some implementations, the modified activity data may be a subset of the activity data as described in block 205 as the blocks 210-250 filter out flood data that may be from a malicious user flooding collaboration platform 120.

At block 255, processing logic may use the modified activity data to perform the gaming process. In implementations, the gaming process is a search process that provides relevant search results responsive to a search query for content items on the gaming platform. In some implementations, the search query by a playing user searching for games 122 hosted by the collaboration platform 120, and the search results may be games that are relevant to the particular search term used in the search query. In some implementations, the search query by a creating user searching for game objects for placement in a developer interface of the gaming platform, and the search results may be game objects that are relevant to the particular search term used in the search query.

For purposes of illustration, rather than limitation a search process for providing relevant search results responsive to a search query for content items on the gaming platform has been described. Aspects of the present disclosure may be provided for other processes, such as other gaming processes, or different sub-processes of a search process.

For example, aspects of the present disclosure may be used for a map-reduce process. In some instances, a user may perform a large number of events, such as 300 k page views. The number of page views creates a large amount of data to process by a map-reduce operation. The large number of page views from a single user may be indicative of atypical user behavior and be considered flood data. The flood data may be removed from the activity data and provided to a map-reduce process.

In another example, aspects of the present disclosure may be used for a messaging operation. In some instances, a user may flood the collaboration platform 120 with messages. For instance, a chatbot may be used to generate conversation with many users. A chatbot may be a computer program that conducts a conversation using auditory or textual methods. The chatbot may simulate human conversation and are used in dialog systems, such as messaging systems. In some implementations, the system may monitor the number of messages sent from particular user account or IP address and compare the number to a threshold. If the number exceeds the threshold, the data may be removed from the system and the account disabled. The flood data may be removed from the system, e.g., not stored in data store 106.

Figure 3:
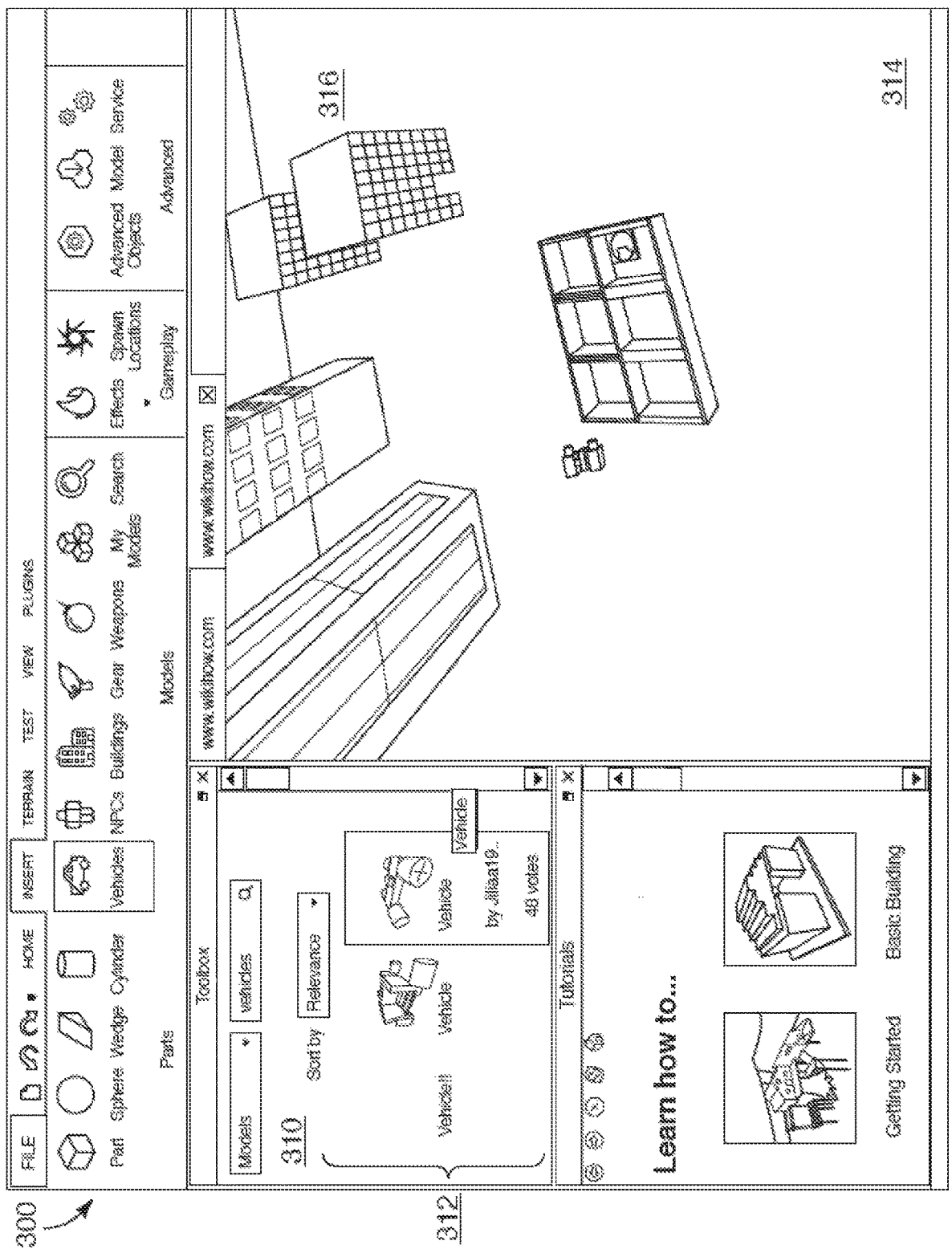
FIG. 3 illustrates a user interface to create and build games on the collaboration platform and search results for game objects, in accordance with some implementations of the disclosure.

FIG. 3 illustrates a user interface to create and build games on the collaboration platform and search results of game objects, in accordance with some implementations of the disclosure. Elements of FIG. 1 and FIG. 2 may be used to help illustrate FIG. 3. In implementations, user interface 300 may be a developer interface that allows a creating user to access creator module 126 of collaboration platform 120. In implementations, a creating user may use collaboration application 114 of client device 110 to access user interface 300. User interface 300 shows a search engine portal 310 that allows a creating user to search for content items, such as game objects (e.g., parts and models). In the present example, the creating user submitted a search query to the search engine 142 of collaboration platform 120 using the search term, "vehicles." Search engine 142 (in conjunction with data flood check module 140) may use activity data (e.g., modified activity data) to perform a search process that returns relevant search results 312 of content items, such as game objects based on a search term, such as "vehicles."

User interface 300 illustrates the placement or insertion of game objects in a game workspace 314. For example, game object 316 (e.g., building) has been retrieved from the search engine portal 310 and inserted into a game workspace 314. In implementations, collaboration platform 120 may track the amount of time the game object 316 is inserted into the game workspace 314.

Figure 4:
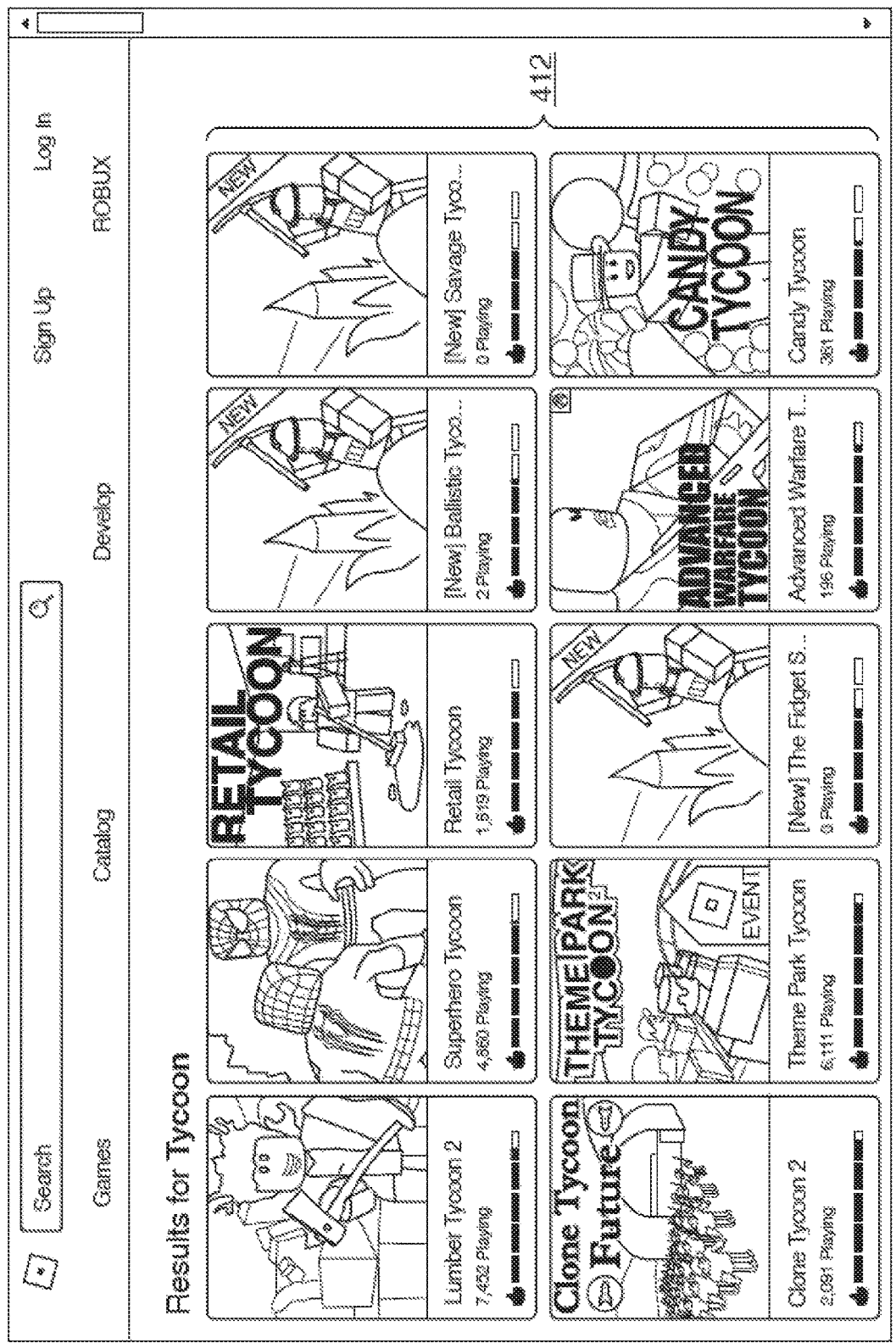
FIG. 4 illustrates a user interface showing search results for games, in accordance with some implementations of the disclosure.

FIG. 4 illustrates a user interface showing search results of games, in accordance with some implementations of the disclosure. Elements of FIG. 1-3 may be used to help illustrate FIG. 4. User interface 400 shows the search results 412 for a search query using the search term, "Tycoon." Search engine 142 (in conjunction with data flood check module 140) may use activity data (e.g., modified activity data) to perform a search process that returns relevant search results 412 that include content items, such as games, based on the search term "Tycoon." As illustrated, the search results 412 include identifiers (e.g., images) of the respective games. In implementations, a user may select a game (e.g., game identifier) from the search results 412 to access the game from collaboration platform 120. In some implementations, the games (e.g., game identifiers) may be displayed in a ranked order. For example, the games may be displayed top, left to right, bottom, left to right in descending ranking order (e.g., 1 through 10 rank).

Figure 5:
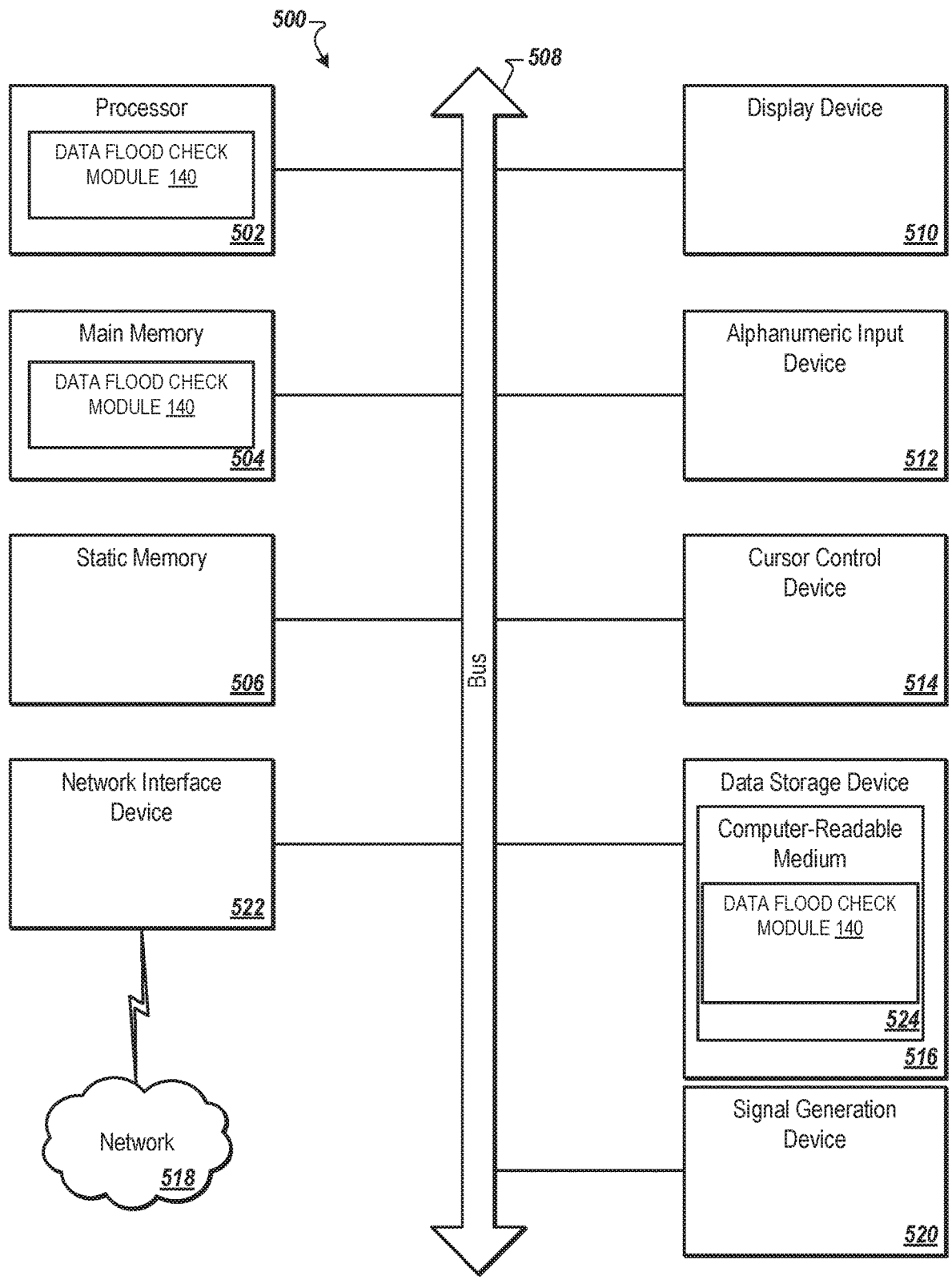
FIG. 5 is a block diagram illustrating an exemplary computer system, in accordance with implementations of the disclosure.

FIG. 5 is a block diagram illustrating an exemplary computer system 500, in accordance with implementations. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of data flood check module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the data flood check module 140 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and data flood check module 140 embodying any one or more of the methodologies or functions or operations described herein. The sets of instructions of the system architecture 100 and data flood check module 140 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "modifying," "generating," "determining," "performing," "parsing," "filtering," "providing," "identifying," "storing," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment"

or the like throughout is not intended to mean the same implementation or embodiment unless described as such. One or more implementations or embodiments may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

We claim:

1. A method, comprising:
   identifying, by a processing device, activity data that is related to activity of a plurality of users of a gaming platform, wherein the activity data is used by the gaming platform to perform a gaming process;
   identifying first data of the activity data based on a first characteristic, wherein the first data is a subset of the activity data;
   determining a number of times that the first data of the activity data meets a first condition of a plurality of conditions, wherein the number of times that the first data of the activity data meets the first condition of the plurality of conditions comprises a number of times that a user submits a search query to perform a search on the gaming platform and does not select any content items from search results responsive to the search query;
   responsive to determining that the number of times that the first data of the activity data meets the first condition satisfies a first threshold, modifying the activity data by removing the first data from the activity data; and
   performing the gaming process using the modified activity data.

2. The method of claim 1, further comprising:
   responsive to determining that the number of times that the first data of the activity data meets the first condition does not satisfy the first threshold, determining a number of times that the first data of the activity data meets a second condition of the plurality of conditions; and
   responsive to determining that the number of times that the first data of the activity data meets the second condition satisfies a second threshold, modifying the activity data by removing the first data from the activity data.

3. The method of claim 2, further comprising:
   responsive to determining that the number of times that the first data of the activity data meets the second condition does not satisfy the second threshold, determining a number of times that the first data of the activity data meets a third condition of the plurality of conditions; and
   responsive to determining that the number of times that the first data of the activity data meets the third condition satisfies a third threshold, modifying the activity data by removing the first data from the activity data, wherein the first threshold, the second threshold, and the third threshold are different from one another.

4. The method of claim 3, wherein the number of times that the first data of the activity data meets the third condition of the plurality of conditions comprises an aggregate of a number of times that the first condition is met and a number of times the second condition is met.

5. The method of claim 2, wherein the number of times that the first data of the activity data meets the second condition of the plurality of conditions comprises a number of times that the user submits the search query to perform the search on the gaming platform and selects a content item from search results responsive to the search query.

6. The method of claim 1, wherein identifying the activity data that is related to the activity of the plurality of users of the gaming platform comprises:
   parsing data of a log file associated with the gaming platform to identify particular features of the data of the log file, wherein the particular features of the data are indicative of particular events that affect the gaming process; and
   filtering the data of the log file having the particular features into the activity data.

7. The method of claim 1, wherein the first characteristic comprises a user account identifier, and wherein identifying the first data of the activity data based on the first characteristic comprises identifying the first data that is associated with a particular user account based on the user account identifier.

8. The method of claim 1, wherein the first characteristic comprises an internet protocol (IP) address.

9. The method of claim 1, wherein the gaming process comprises a process to provide the search results responsive to the search query for content items on the gaming platform.

10. The method of claim 9, wherein the content items comprise game objects for placement in a developer interface of the gaming platform.

11. The method of claim 1, further comprising:
    storing the modified activity data in a data store accessible by the gaming process.

12. A system, comprising:
    a memory; and
    a processing device coupled to the memory, wherein the processing device is operative to:
       identify activity data that is related to activity of a plurality of users of a gaming platform, wherein the activity data is used by the gaming platform to perform a gaming process;
       identify first data of the activity data based on a first characteristic, wherein the first data is a subset of the activity data;
       determine a number of times that the first data of the activity data meets a first condition of a plurality of conditions;
       responsive to a determination that the number of times that the first data of the activity data meets the first condition satisfies a first threshold, modify the activity data by removal of the first data from the activity data;
       responsive to a determination that the number of times that the first data of the activity data meets the first condition does not satisfy the first threshold, determine a number of times that the first data of the activity data meets a second condition of the plurality of conditions; and responsive to a determination that the number of times that the first data of the activity data meets the second condition satisfies a second threshold, modify the activity data by removal of the first data from the activity data; and provide the modified activity data to the gaming process, wherein the gaming process uses the modified activity data in a performance of the gaming process.

13. The system of claim 12, wherein the gaming process comprises a process to provide search results responsive to a search query for content items on the gaming platform.

14. A non-transitory computer-readable medium comprising instructions stored thereon that, responsive to execution by a processing device, cause the processing device to perform operations comprising:

identifying activity data that is related to activity of a plurality of users of a gaming platform, wherein the activity data is used by the gaming platform to perform a gaming process;

identifying first data of the activity data based on a first characteristic, wherein the first data is a subset of the activity data;

determining a number of times that the first data of the activity data meets a condition, wherein the number of times that the first data of the activity data meets the condition is based on a number of times that a user submits a search query to perform a search on the gaming platform and whether a content item, from search results responsive to the query, is selected;

responsive to determining that the number of times that the first data of the activity data meets the condition satisfies a first threshold, modifying the activity data by removing the first data from the activity data; and performing the gaming process using the modified activity data.

15. The non-transitory computer-readable medium of claim 14, wherein the gaming process comprises a process to provide relevant search results responsive to a search query for content items on the gaming platform.

16. The non-transitory computer-readable medium of claim 14, wherein the number of times that the first data of the activity data meets the condition comprises the number of times that the user submits the search query to perform the search on the gaming platform and does not select any content items from the search results responsive to the search query.

17. The non-transitory computer-readable medium of claim 14, wherein the number of times that the first data of the activity data meets the condition comprises the number of times that the user submits the search query to perform the search on the gaming platform and selects any content item from the search results responsive to the search query.

18. The non-transitory computer-readable medium of claim 14, wherein the number of times that the first data of the activity data meets the condition comprises an aggregate of:

the number of times that the user submits the search query to perform the search on the gaming platform and does not select any content items from the search results responsive to the search query, and the number of times that the user submits the search query to perform the search on the gaming platform and selects any content item from the search results responsive to the search query.

\* \* \* \* \*